United States Patent
Meyer et al.

(10) Patent No.: US 6,330,541 B1
(45) Date of Patent: *Dec. 11, 2001

(54) SYSTEM AND METHOD FOR CONTROLLING AND SECURITIZING THE CASH VALUE GROWTH AND/OR DEATH BENEFITS OF A LARGE POOL OF INSURANCE POLICIES

(76) Inventors: Bennett Stephen Meyer, 1284 Fritz Cir., Huntingdon Valley, PA (US) 19006; William Donald Chatfield, 5 E. Buck Rd., Downington, PA (US) 19335

(*) Notice: Subject to any disclaimer, the term of this patent is extended or adjusted under 35 U.S.C. 154(b) by 0 days.

This patent is subject to a terminal disclaimer.

(21) Appl. No.: 09/004,154

(22) Filed: Jan. 7, 1998

(51) Int. Cl.[7] .................................................. G05F 17/60
(52) U.S. Cl. ................................................. 705/4; 705/36
(58) Field of Search ...................................... 705/4

(56) References Cited

U.S. PATENT DOCUMENTS

| | | | | |
|---|---|---|---|---|
| 5,752,236 | * | 5/1998 | Sexton et al. | 705/4 |
| 5,806,042 | * | 9/1998 | Kelly et al. | 705/4 |
| 5,907,828 | * | 5/1999 | Meyer et al. | 705/4 |
| 6,041,304 | * | 3/2000 | Meyer et al. | 705/4 |
| 6,049,772 | * | 4/2000 | Payne et al. | 705/4 |

FOREIGN PATENT DOCUMENTS

401276270A * 11/1989 (JP).
WO 97/12336 A1 * 4/1997 (WO).

OTHER PUBLICATIONS

U.S. Code. Citation of 26 USC Section 7702 [online]. Internal Revenue Code Jan. 26. 1998[retrieved on Sep. 29, 1999]. Retrieved from the Internet:<URL: http://law2.house.gov/uscode-cgi>.*

* cited by examiner

Primary Examiner—Tariq R. Hafiz
Assistant Examiner—Susanna Meinecke-Diaz
(74) Attorney, Agent, or Firm—Blank Rome Comisky & McCauley LLP

(57) ABSTRACT

A system and method of managing an actuarially credible pool of life insurance policies to generate a consistent cash flow from death benefits paid on the insurance policies. The system and method accessing selected data having terms associated therewith, wherein the data is representative of the pool of life insurance policies. The cash value of the pool of life insurance policies is calculated from the selected data of the pool of life insurance policies for a predetermined point in time. The cash value of the pool of life insurance policies is compared to a predetermined cash value at the predetermined point in time. Then at least one of the terms is modified in accordance with a predetermined criteria, so that the cash value of the life insurance policies is managed and an actuarially definable cash flow may be obtained. This cash flow is then analyzed, so that at least a portion thereof may be sold to a third party.

12 Claims, 18 Drawing Sheets

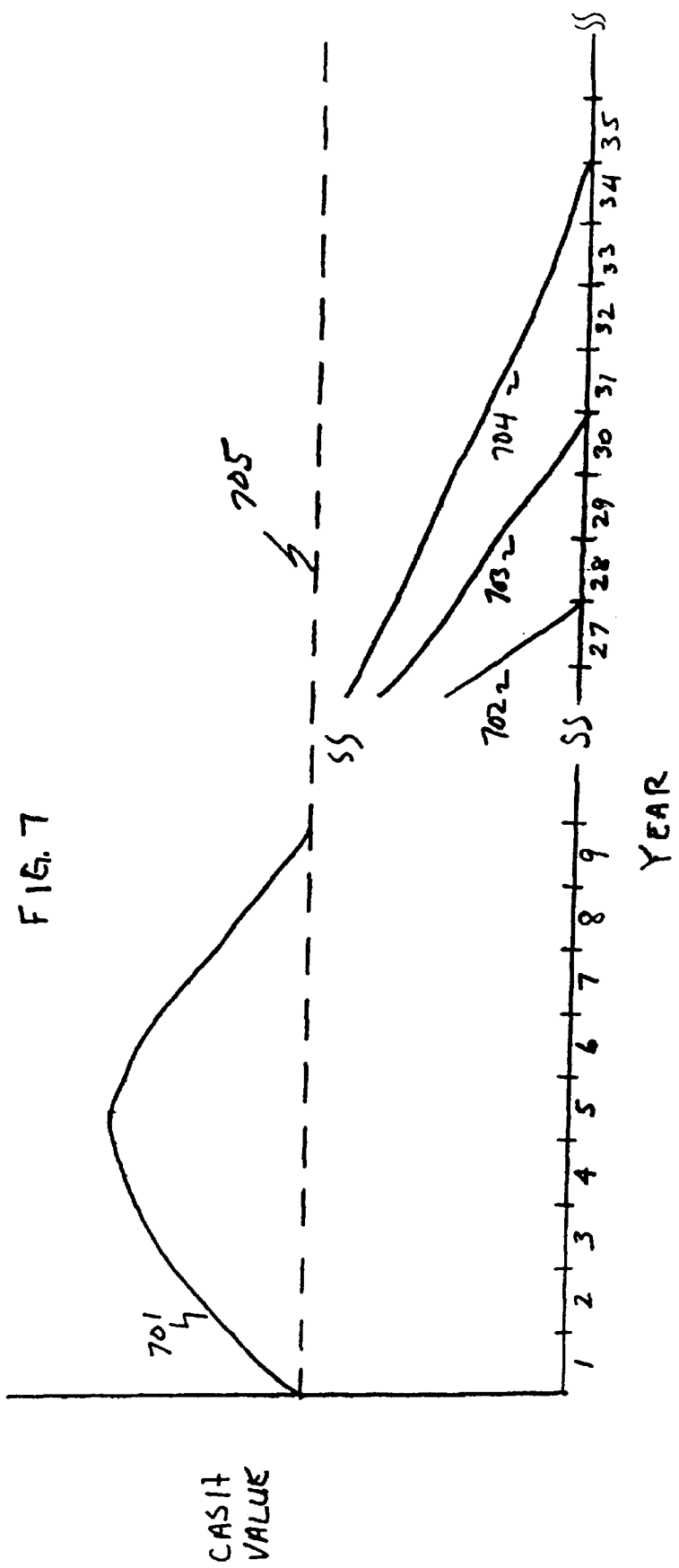

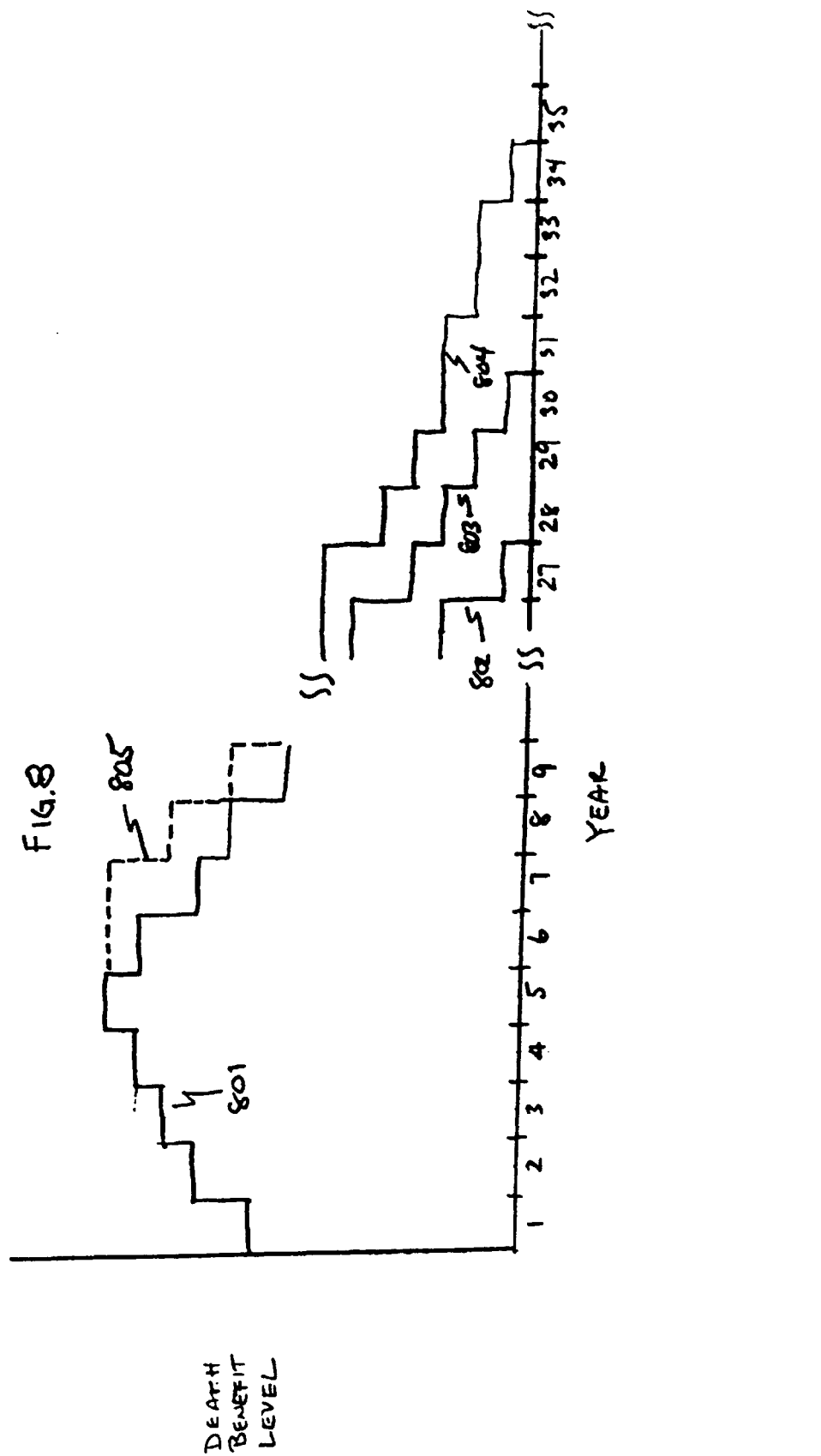

Insurance Cash Flow and Earnings Impact for Sample

Generic MCPP Product - Carrier Net Earned Rate of 10.00%
(000's)

*INSURANCE ONLY - DOES NOT INCLUDE OTHER PROGRAM COSTS/BENEFITS*

| | INSURANCE CASH FLOW | | | INSURANCE VALUES | | | IRR |
|---|---|---|---|---|---|---|---|
| Year | Policy Premium | Insurance Proceeds | Insurance Cash Value | DAC Asset | Total Face Amount | | Cumulative I.R.R. * (incl. Net CV) |
| | (1) | (2) | (10) | (11) | (12) | | (13) |
| 1 | ($1,000,000) | $32,275 | $1,006,112 | $39,388 | $23,631,154 | | 7.90% |
| 2 | 0 | 41,489 | 1,050,299 | 35,242 | 23,392,179 | | 7.93% |
| 3 | 0 | 51,623 | 1,086,964 | 31,096 | 23,127,021 | | 7.93% |
| 4 | 0 | 62,881 | 1,114,134 | 26,950 | 22,833,344 | | 7.92% |
| 5 | 0 | 74,953 | 1,130,013 | 22,804 | 22,509,061 | | 7.91% |
| 6 | 0 | 88,029 | 1,132,419 | 18,658 | 22,151,819 | | 7.89% |
| 7 | 0 | 102,168 | 1,118,902 | 14,512 | 21,759,143 | | 7.87% |
| 8 | 0 | 107,802 | 1,097,717 | 10,365 | 21,338,168 | | 7.84% |
| 9 | 0 | 113,151 | 1,068,486 | 6,219 | 20,742,530 | | 7.82% |
| 10 | 0 | 116,471 | 1,032,802 | 2,073 | 19,268,718 | | 7.80% |
| 11 | 0 | 122,808 | 987,979 | (0) | 18,743,335 | | 7.80% |
| 12 | 0 | 103,543 | 958,957 | (0) | 14,997,690 | | 7.81% |
| 13 | 0 | 93,628 | 938,720 | (0) | 12,784,253 | | 7.82% |
| 14 | 0 | 96,919 | 912,912 | (0) | 12,127,026 | | 7.82% |
| 15 | 0 | 96,135 | 885,698 | (0) | 10,890,652 | | 7.83% |
| 16 | 0 | 99,282 | 852,427 | (0) | 10,440,172 | | 7.83% |
| 17 | 0 | 101,739 | 813,328 | (0) | 9,961,676 | | 7.83% |
| 18 | 0 | 103,664 | 768,469 | (0) | 9,454,127 | | 7.83% |
| 19 | 0 | 105,227 | 717,732 | (0) | 8,916,263 | | 7.82% |
| 20 | 0 | 106,538 | 660,861 | (0) | 8,346,678 | | 7.82% |
| Sum | | | | | | | |
| 1-10 | (1,000,000) | 790,842 | | | | | 7.80% |
| 1-20 | (1,000,000) | 1,820,324 | | | | | 7.82% |
| 1-30 | (1,000,000) | 2,663,971 | | | | | 7.74% |

* The IRR calculation assumes that insurance proceeds and tax savings are received pro-rata throughout the

FIG 12a

SYSTEM AND METHOD FOR CONTROLLING AND SECURITIZING THE CASH VALUE GROWTH AND/OR DEATH BENEFITS OF A LARGE POOL OF INSURANCE POLICIES

BACKGROUND OF THE INVENTION

The present invention is directed to a system and method for controlling and securitizing the cash value growth and/or death benefits of a large group of insurance policies and, in particular, to a system and method that monitors death rates and interest rates in a large pool of policies and adjusts premium rates and death benefit levels in order to control cash value growth in the pool of policies and to generate cash flow from death benefits that may be securitized.

Life insurance policies are often purchased by companies for different purposes. For example, a company may purchase life insurance policies for its employees as a benefit of their employment, with death benefits going to the employee's beneficiaries. A bank may purchase life insurance policies on its borrowers with death benefits going to the bank at levels sufficient to cover the outstanding mortgage amounts.

Typically, companies also use the life insurance policies as an investment vehicle. Present corporate owned life insurance policies attempt to maximize positive cash value growth ("CVG"), thus increasing the cash value of the policies (as used herein, CVG is the difference between the cash value of the insurance policy and the basis of the insurance policy). CVG is maximized by simply keeping death benefits at a minimum. In some situations, however, large positive CVG can adversely affect a company's liquidity, and investment and business options due to regulatory limitations on the amount of investment they can have in life insurance. Thus, if an institution has a large number of life insurance policies to cover its borrowers or employees, as the CVG increases, the institution will have a limited number of borrowers or employees to remain in regulatory compliance. Alternatively, if the cash value is controlled, then more people may be insured.

Another disadvantage of large CVG is that if borrowers prepay their mortgages, the bank may want to exchange the insured of the life insurance policies covering the original borrowers to the new borrowers. Large CVG may have a significant adverse financial impact on the bank when it effects these exchanges.

Accordingly, there is a need for a system to manage the CVG of life insurance policies and to ensure that the insurance policies remain in regulatory compliance. Additionally, when the cash value of the policy is controlled and cash flow can be actuarially calculated to a high certainty and, in fact, the cash flow from the payment of death benefits can be controlled. The cash flow has a calculable value. Thus, it is desirable to have a computer system to monitor cash values in a large pool of insurance and to securitize at least a portion of the cash flow.

SUMMARY OF THE INVENTION

The present invention provides a unique system and method that overcomes the disadvantages of the prior art systems by managing the CVG of large pools of insurance policies through monitoring death rates and interest rates, and adjusting premium payments and death benefit levels. Thereby returning excess CVG to the beneficiary as death benefits.

In one preferred embodiment of the invention, the system accesses selected data having terms associated therewith. These terms can be, for example, the death benefit, premium, credited interest, etc. of the insurance policy. The data may consist of data for the terms for a point in time or may consist of historical and/or future data. The system then calculates a first value, such as the cash value of the insurance policy, from the accessed data for a predetermined point in time. Next, the system compares the first value to a predetermined value. For instance, the system may compare the cash value to a precalculated target cash value for the predetermined point in time. The system then applies an adjustment to the results of the comparison in accordance with a predetermined criteria. As an example, the system, based upon the comparison determines the death benefit adjustment. The system then modifies at least one of the terms, such as the death benefit, in accordance with the adjustment so that the cash value growth of the life insurance policy is managed. The system then calculates the present value of the future cash flow and CVG, so that an optimal portion of the cash flow and CVG may be sold.

In another preferred embodiment, the invention accesses selected data having terms associated therewith. These terms can be, for example, the death benefit, premium, credited interest, etc. of the insurance policy. The data may consist of data for the terms for a point in time or may consist of historical and/or future data. The system then calculates a first value, such as the cash value of the insurance policy, from the accessed data for a first predetermined point in time. The system also calculates a second value, such as the cash value of the insurance policy, from the accessed data for a second predetermined point in time. Next, the system compares the first value to a predetermined criteria, for example, the basis, to determine for instance, if the cash value is greater than the basis and by how much, for the first predetermined point in time. The system also compares the second value to a second predetermined criteria, for example, zero, to determine, for instance if the second cash value of the insurance policy is greater than a criteria amount over zero for the second predetermined point in time. The system then applies an adjustment to at least one of the said comparisons in accordance with a third predetermined criteria. For example, the system, based upon the comparisons, determines the death benefit adjustment. The system then modifies at least one of the terms, such as the death benefit, in accordance with the adjustment so that the cash value growth and death benefits of the insurance policy are managed. The system then projects the cash flow of the pool of policies received as death benefits and the CVG of the pool of policies and calculates the present value thereof under a predetermined fixed interest rate, so that at least a portion of the projected cash flow and/or CVG may be sold to a third party.

In yet another preferred embodiment, the system accesses selected data having terms associated therewith. These terms can be, for example, the death benefit, premium, credited interest, etc. of the insurance policy. The data may consist of data for the terms for a point in time or may consist of historical and/or future data. The system then calculates a first value, such as the cash value of the insurance policy, from the accessed data for a first predetermined point in time. The system also calculates a second value, such as the basis, from the accessed data for the first predetermined point in time. The system also calculates a third value, such as the cash value, from the accessed data for a second predetermined point in time. The system compares the first value to the second value of the insurance policy, for example, to obtain the amount of the cash value over the basis, and also compares the third value to a first predetermined criteria, such as zero, to determine if the cash value at the second predetermined point in time is a certain amount greater than zero. Based upon these comparisons, the system applies an adjustment to at least one of the comparisons in accordance with a second predetermined criteria. For example, if the amount of the cash value over the basis is greater than a certain predetermined amount, then the amount that the death benefit level should be raised, if possible, is determined. The system then modifies at least one of the terms in accordance with the adjustment, such as raising the death benefit by the amount determined, so that the cash value growth of the insurance policy is managed. Additionally, the cash flow is managed. Thus, when an actuarially credible population is insured, the system can predict the cash flow. Then the present value of the cash flow is calculated, and sold in a private placement or the like.

Accordingly, it is an object of this invention to provide a system and method for managing the CVG and/or cash flow of a large pool of life insurance policies by adjusting the death benefit and/or premium payments of individual policies in view of interest rates and actual deaths of insureds to meet cash flow milestones while remaining in regulatory compliance.

It is also an object of this invention to provide a system and method of calculating and administering the adjustments to the life insurance policies over the life of the policies, calculating cash flows and the present values thereof, so that the cash flows may be sold.

It is also an object of this invention to increase a company's ability to work within capital limitations set by regulators.

Yet another object of the invention is to administer an actuarially credible pool of life insurance policies so that they may be sold to a third party and removed from the balance sheet of the beneficiary entity. An actuarially credible pool of life insurance policies normally includes in the range of at least approximately 10,000 lives.

Additional objects and advantages of the invention can be obtained by reference to the following detailed description of the preferred embodiments thereof in connection with the attached drawings.

BRIEF DESCRIPTION OF THE DRAWINGS

FIG. 7 is a graph of the cash value of an exemplary insurance policy over time;

FIG. 8 is a graph of the death benefit levels of the exemplary insurance policy of FIG. 7 over time;

FIG. 12a is a spreadsheet illustrating insurance cash flows and cash values in the policies over time.

DETAILED DESCRIPTION OF THE PREFERRED EMBODIMENTS

FIG. 7, illustrates graphically the cash value, depicted by line 701, of an exemplary 30-year single premium insurance policy over a period of time. Line 701 illustrates that in this insurance policy, the cash value of the policy rises in the early years, then starts to decrease after around the fifth year. If the cash value reaches zero before the term of the policy, as shown by line 702, then the policy lapses since there are insufficient funds to keep the policy in-force for the duration of the term. If there is cash value at the end of the policy, as shown by line 704, then the policy has not lapsed, but has surplus cash value to provide, in this example, insurance coverage for several additional years. However, at some point, the policies become unprofitable to the owner and should be canceled. Profitability of the policies is discussed in more detail below.

In a preferred embodiment, the ideal situation is depicted by lines 701 and 703 depicting minimal cash value at the end of the insurance policy term. Line 705 depicts the basis of the insurance policy.

Figure 9A:
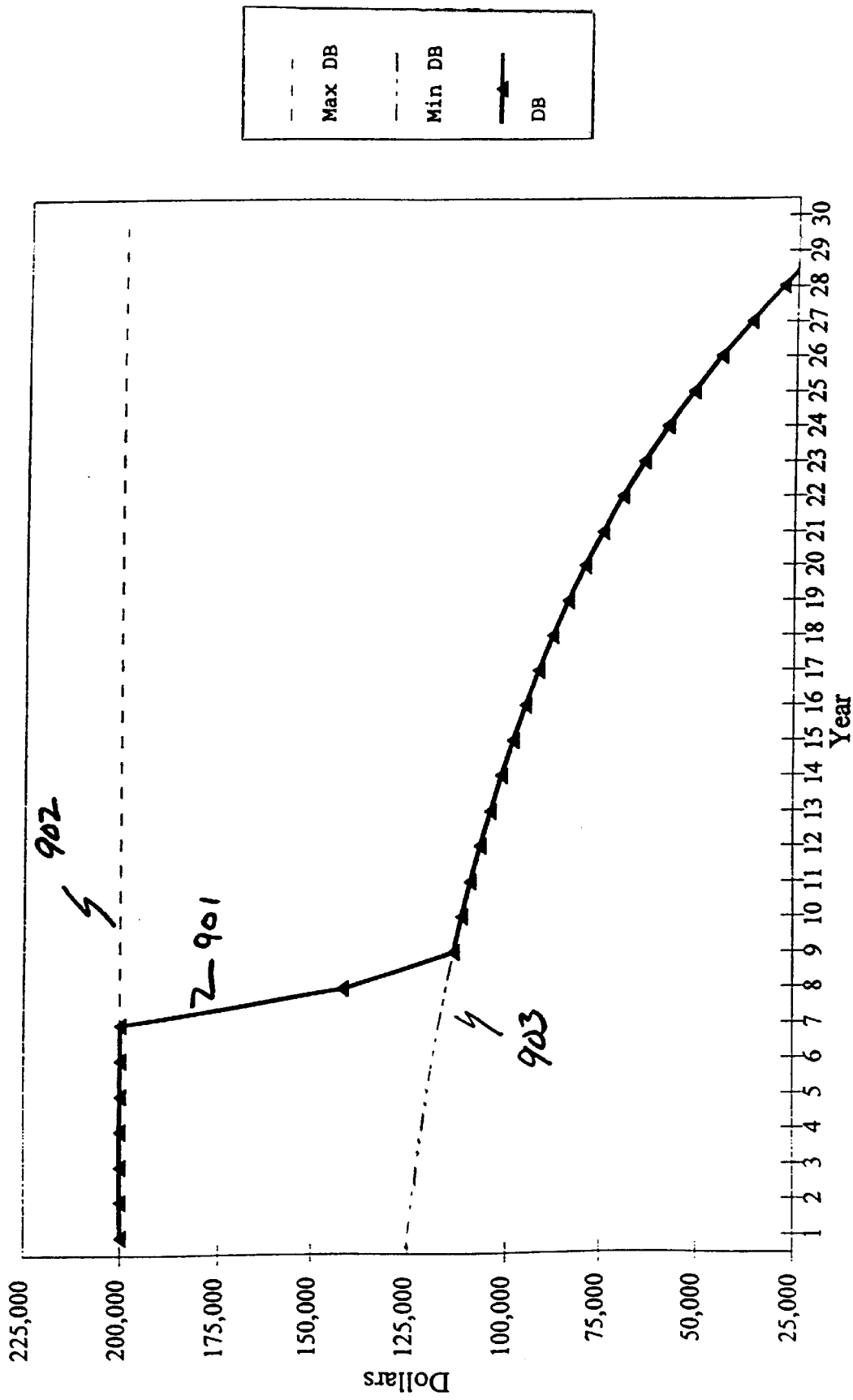
FIGS. 9 through 11 provide additional exemplary graphs illustrating CVG and death benefit levels verses time.

FIG. 8 depicts changes in the death benefit level of an exemplary policy in accordance with one aspect of the present invention. Lines 801 and 803 depict one possible situation where the cash value growth matches the company's cash value growth objectives, and thus does not need to be adjusted beyond a predetermined schedule. In this example the death benefit level is adjusted once per year. The death benefits rise in the early years, until about the fifth year where it starts to decrease. Other possibilities include the death benefit level being adjusted to track the value of an asset, such as an outstanding loan, or starting at a high level, and then being reduced in succeeding years, as shown in FIG. 9a.

If the death benefit level terminates before the end of the policy term, as shown by line 802, that may indicate that the policy has lapsed because of because of insufficient cash value. This is not desirable. It is desirable for the system to periodically calculate the premium, death benefits and cash value in view of the interest rates at that time. Thus, if the cash values are falling too low to support the desired death benefits, it may be required to add additional premium dollars. The system automatically evaluates the profitability of the policies. At a point prior to lapse, the system automatically evaluates the policy and recommends a course of action, either adding additional premium, or surrendering a policy once there is no longer profitability.

Death benefits beyond the end of the policy term, as shown by line 804, may indicate the presence of surplus cash value that can continue to fund the policy for several years beyond the original policy term. In the preferred embodiment, as depicted by lines 801 and 803, the death benefit should be minimized at the end of the policy term, although there may be desirable minimum levels of death benefits required.

Line 805 illustrates adjustments to the death benefit level in accordance with one aspect of the present invention to control the CVG of the insurance policy and the death benefit proceeds paid out by the policies. In particular, assume that there is higher than desired cash value growth in year five. Then, line 805 depicts that in year six, the death benefit level is adjusted higher, thereby increasing the cost of insurance, which in turn reduces the excess CVG.

Additionally, it increased cash flow distributed in year five based on deaths of insureds. In year seven, the duration of a death benefit level is again adjusted to remain at the same level for another year to further reduce the CVG. In each of years eight and nine, the death benefit level is adjusted downward, to more closely match, for example, the amortized mortgage amount for those years. Additionally, as the premium level decreases, the advantages provided by the policies are diminished. Accordingly, at a predetermined point the policies are no longer profitable. The program periodically checks each policy for profitability. The process and calculators for determining profitability are provided below in connection with FIG. 5a.

FIGS. 9a through 11b, provide additional exemplary illustrations in accordance with various aspects of the present invention. In FIGS. 9a, 10a and 11a, respective lines 901, 1001, and 1101, represent the death benefit level over time. Lines 902, 1002, and 1102 represent the maximum death benefit level for the insurance policy in accordance with an exemplary Unites States insurance law. Different states, though, have different insurance related laws, and thus this maximum death benefit may change from state to state. Lines 903, 1003, and 1103 represent the minimum death benefit level, which would, in this case, be the amortized mortgage amount of the exemplary loan over time.

Figure 9B:
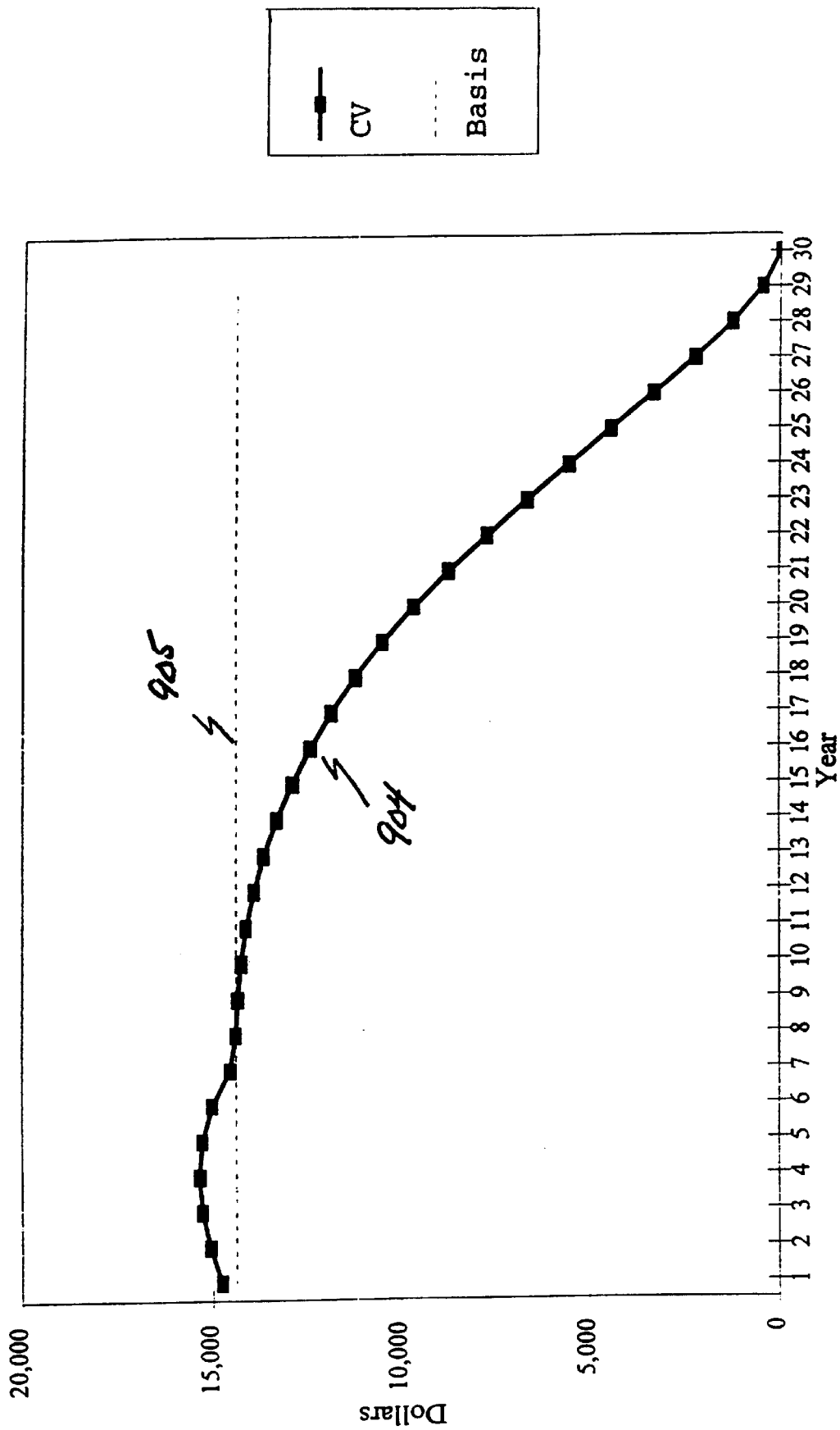
Figure 10A:
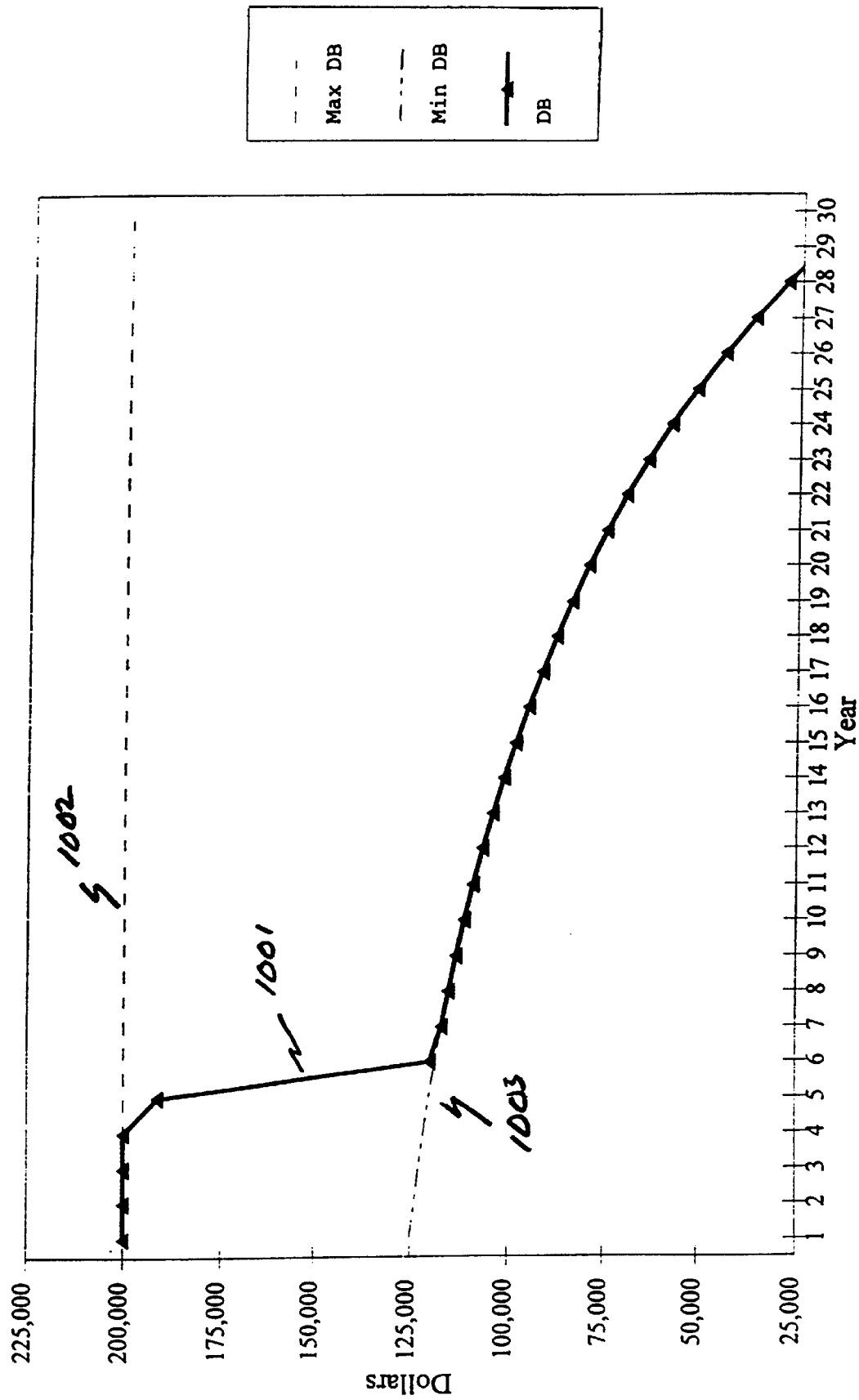
Figure 10B:
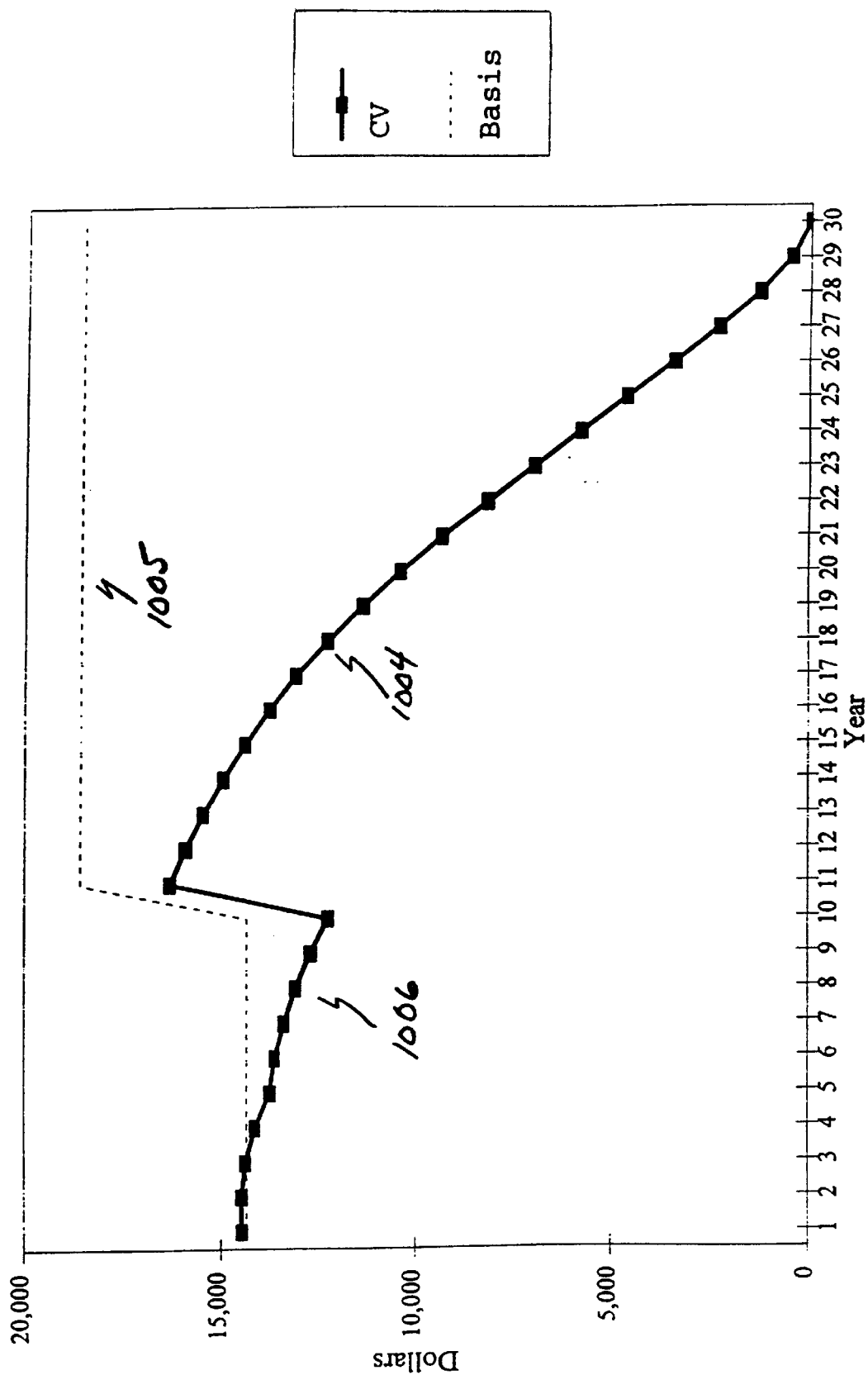
Figure 11A:
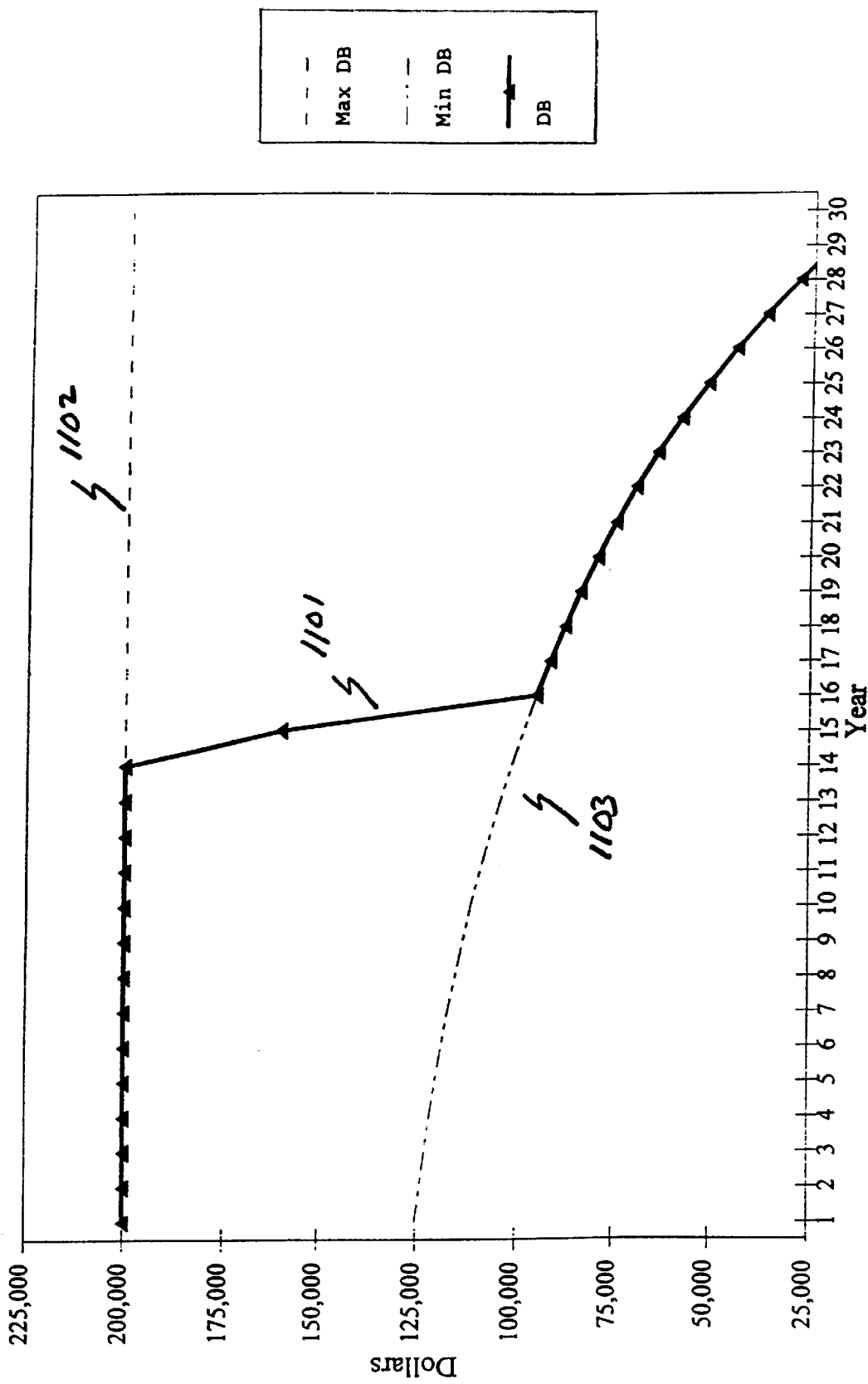
Figure 11B:
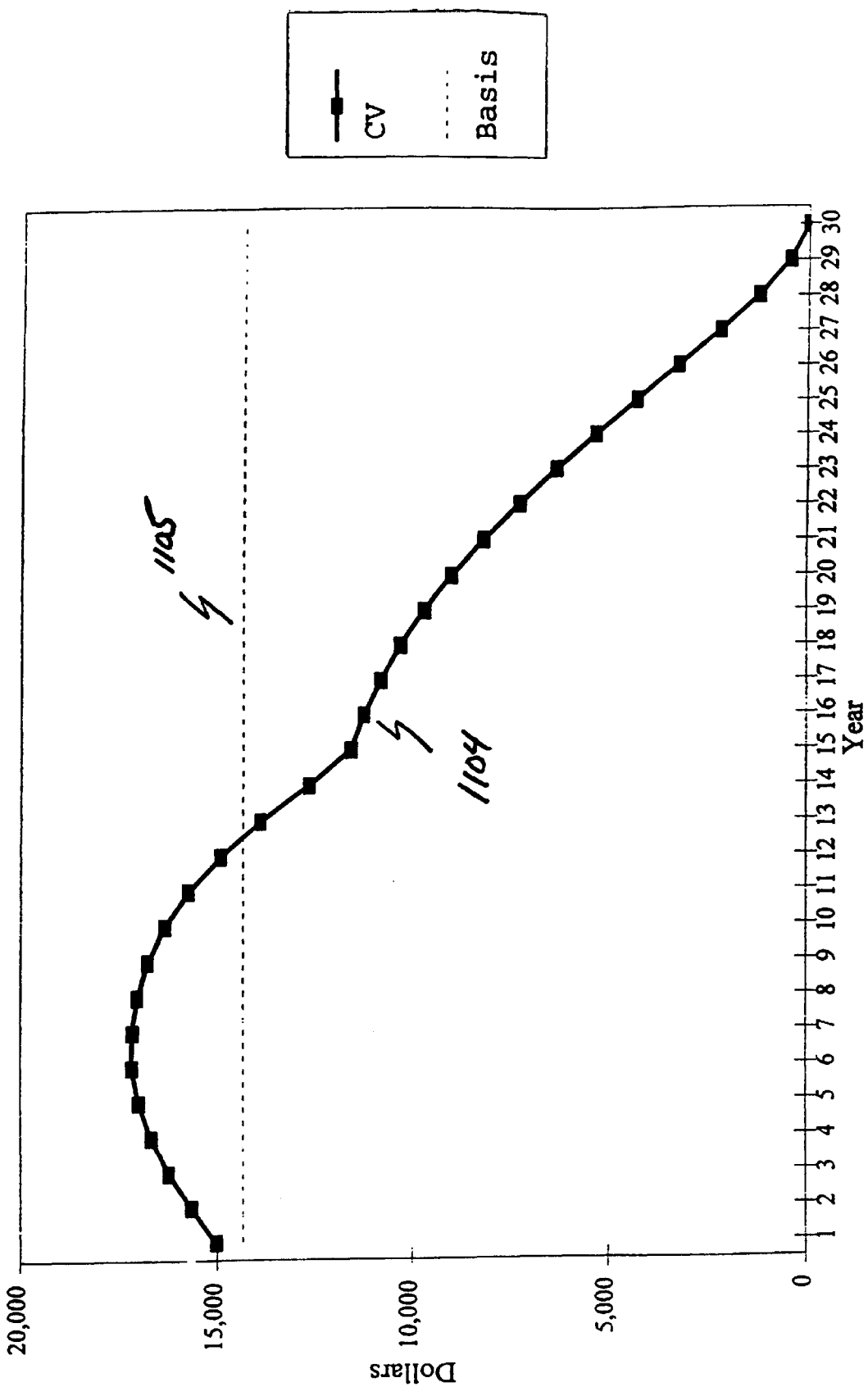

In FIGS. 9b, 10b, and 11b, respective lines 904, 1004 (including line 1006), and 1104, represent the cash value of the insurance policy over time. Lines 905, 1005, and 1105 represent the basis of the insurance policy over time.

These sets of figures illustrate three different scenarios in accordance with various aspects of the present invention. FIGS. 9a and 9b present a base case where the death benefit is maintained for the first eight years at a high level for as long as CVG is greater than zero. Once the cash value equals or drops below the basis, the death benefit level is adjusted to follow the amortized mortgage amount.

FIGS. 10a and 10b take the same initial scenario as in FIGS. 9a and 9b, but where the CVG is less than expected. As shown by the portion of line 1004 identified as line 1006, the cash value of the insurance policy has dropped below the basis in year four, in contrast with year eight in FIG. 9b. Thus, in this example, the death benefit level also drops down to the minimum death benefit level, i.e., the amortized mortgage amount, by year eight. By year ten the remaining cash value of the insurance policy is determined to be insufficient to fund the policy for the full thirty years, and additional premiums are added to increase the cash value to sustain the policy for the full term.

FIGS. 11a and 11b take the same initial scenario as in FIGS. 9a and 9b, but assume that the CVG is greater than expected. In this case, the death benefit level is kept at the maximum level through year 14, where it then drops by year 16 to a level no less than the amortized mortgage amount. The high death benefit level is sustained for several years even beyond the time which the cash value of the insurance policy has dropped below the basis, in contrast with the scenarios depicted in FIGS. 9b, and 10b, to control the effect of the excess CVG in the earlier years, and to keep the policy from extending past the designated term.

Figure 1:
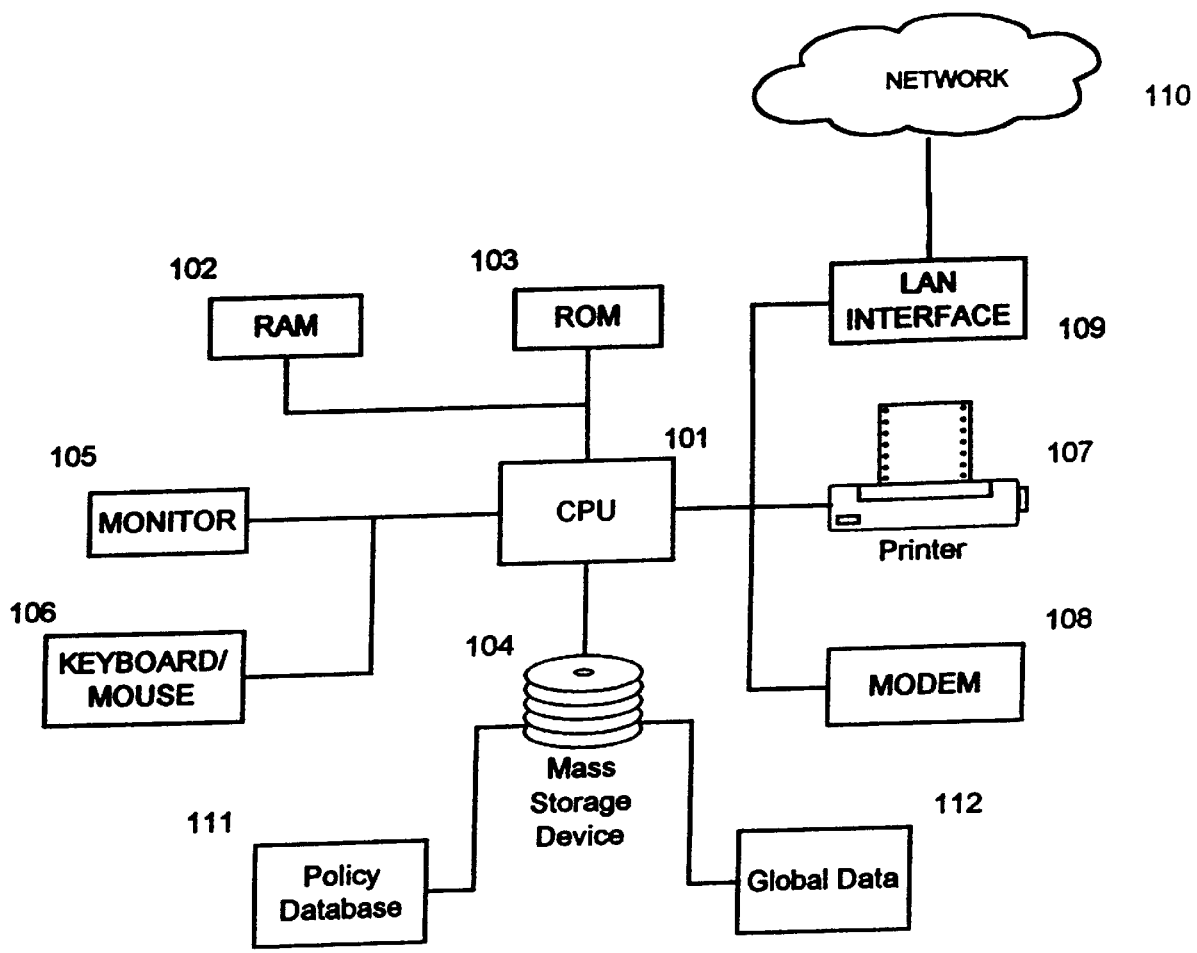
FIG. 1 is a block diagram depicting an apparatus in accordance with various aspects of the invention.

FIG. 1 is a block diagram illustration of an apparatus according to one aspect of the present invention. In particular, the apparatus of FIG. 1 includes CPU 101 for executing program instructions. These program instructions can be stored in RAM 102, ROM 103, and/or mass storage device 104 for access by CPU 101. Also connected to CPU 101 is monitor 105 and keyboard/mouse 106 for allowing an operator to manipulate and input information. Upon appropriate program instructions, CPU 101 outputs to printer 107, modem 108, and/or LAN interface 109 information generated in accordance with the present invention, as will be set forth in greater detail below.

Mass storage device 104, such as a hard disk, disk array, or PC Card storage device, is connected for access by CPU 101. Although depicted here as directly connected to CPU 101, such direct connection need not be used. Alternatively, there may be intervening devices, or mass storage device 104 may instead be connected to network 110, and thus separate from, but still be accessible by, CPU 101. Typically, mass storage device 104 stores program instructions which are accessed and executed by CPU 101. In addition, mass storage device 104, RAM 102, and/or ROM 103 can store data, such as policy database 111 and global data 112, which are accessed and processed by CPU 101 in accordance with the program instructions. Other program instructions and data may also be stored on mass storage device 104 and executed by CPU 101 as designated by the operator. Policy database 111 is shown in FIG. 1 connected with CPU 101.

Data that apply to all policy records may be stored in global data 112. Global data 112 may include actuarial mortality data, cost data, and data necessary to ensure that changes to the terms and values of the insurance policy, such as the cash value and death benefit level, of each insurance policy comply with all applicable governmental regulations. For example, in the United States, IRS Regulation §7702 sets forth different alternative tests for defining what constitutes a life insurance contract. The first test looks to the cash value accumulation of the insurance policy. The second test looks to the cash value corridor, which is a function of the death benefit and cash surrender value. Global data 112, thus contains the necessary data for CPU 101 to determine in later steps compliance with this regulation. Other countries, such as Canada, have similar governmental regulations with which the system must comply.

Figure 2:
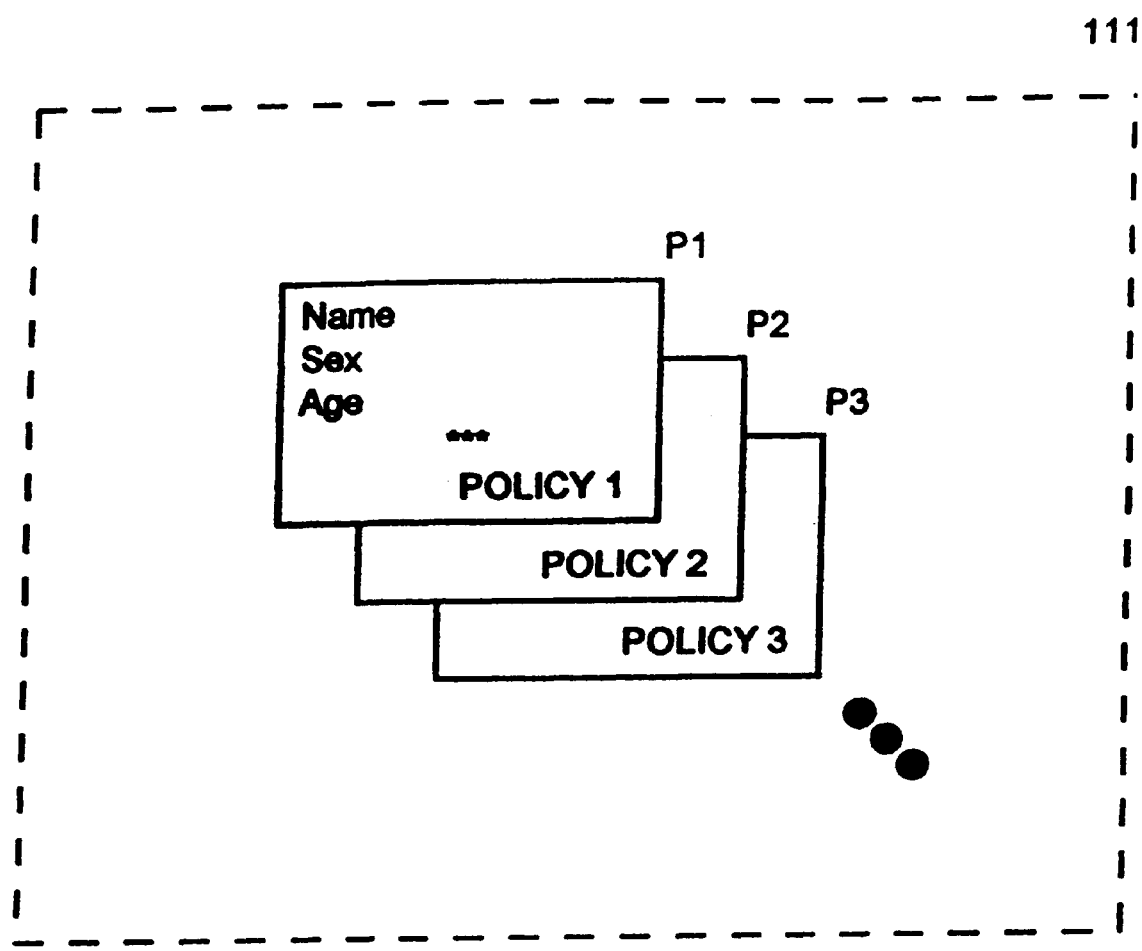
FIG. 2 is a block diagram of a life insurance database containing data for individual life insurance policies.

FIG. 2 depicts in greater detail one embodiment of the data structure of policy database 111, which holds the data for a block of insurance policies. In particular, policy database 111 comprises a set of policy records. As an example, three policy records P1, P2, and P3 are depicted in FIG. 2. Each policy record represents the data for an individual life insurance policy stored on mass storage 104. It is of course understood by one skilled in the art that there may be a different number of policy records than those shown in FIG. 2. For example, a company purchasing a block of 30,000 insurance policies would typically have at least 30,000 policy records in policy database 111. For simplicity, a bank will be used herein to illustrate operation of the present invention, although such use is not limited to a bank.

Figure 3:
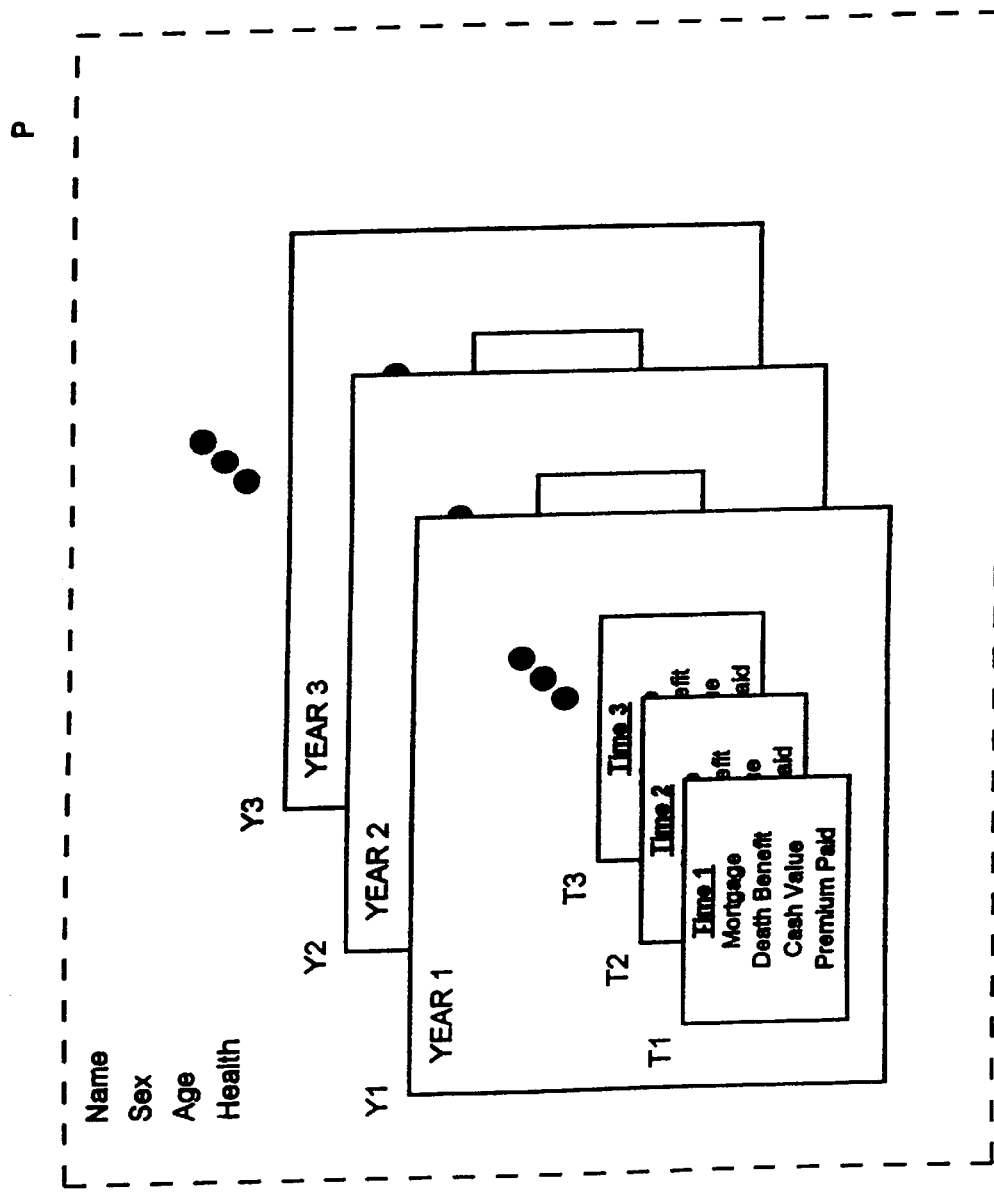
FIG. 3 is a detailed block diagram of the data retained by each individual life insurance policy.

FIG. 3 shows a generic policy record P as representative of the types of data stored in any specific individual policy record. In the specific embodiment shown in FIG. 3, policy record P has fields to store the data representative of an individual policy holder, such as the holder's NAME, SEX, AGE, and HEALTH. Policy record P is, however, not limited to a single-life insurance policy—it may also represent other types of insurance policies, such as joint first-to-die policies and the associated information for each individual listed on those policies.

Policy record P may also store data representing the past, present, and projected future value of various terms and values of the insurance policy. These terms and values may include, among other things, the death benefit, mortgage amount, premiums paid and to be paid, and cash value. Referring to FIG. 3, policy record P includes in this embodiment related records for a number of the years, depicted as year records Y1, Y2, and Y3, where each year record contains the terms and values of the insurance policy for a particular year. Although only three year records are shown in FIG. 3, if projected terms and values are to be retained, there may be about 100 related year records for a specific policy.

When practicing the invention, the system may automatically update and adjust the insurance policies' data several times a year. These updates or adjustments are based on predetermined events, such as changes in interest rates or death rate in a given year. Accordingly, each year record includes related time records T1, T2, and T3. These time records store the terms and values of the insurance policy for given points in time. As before, although only three time records are shown in FIG. 3, the actual number of related time records for each year record could vary.

In the preferred embodiment, the actual terms and values for each of the insurance policies in database 111 would be updated at predetermined times; for example, once a month. Thus, each related year record would include twelve time records, one for each month of that year. Also, the future values for the terms and values, such as the cash value of the policy 27 years in the future would also be calculated. Furthermore, as noted above, a calculation is made to determine when an insurance policy is no longer profitable.

There are of course many variations on how much data to retain that is within the scope of the present invention. For instance, if only the most current terms and values need to be retained, then only one time record needs to be stored. In addition, any records needed for calculations can be temporarily created during calculations and discarded afterwards, which has the advantage of reducing the data required to be saved at the expense of easy access to projected values.

Likewise, FIG. 2 shows policy database 111 as a single database file for simplicity, with policy records already created. In practice, policy database 111 may be a relational database design where the policy records, related year records and related time records are in different databases that may be related, one to another, as seen fit by the user. These and other types of database designs and data structures, such as object-oriented database designs, are well known in the art.

Figure 4:
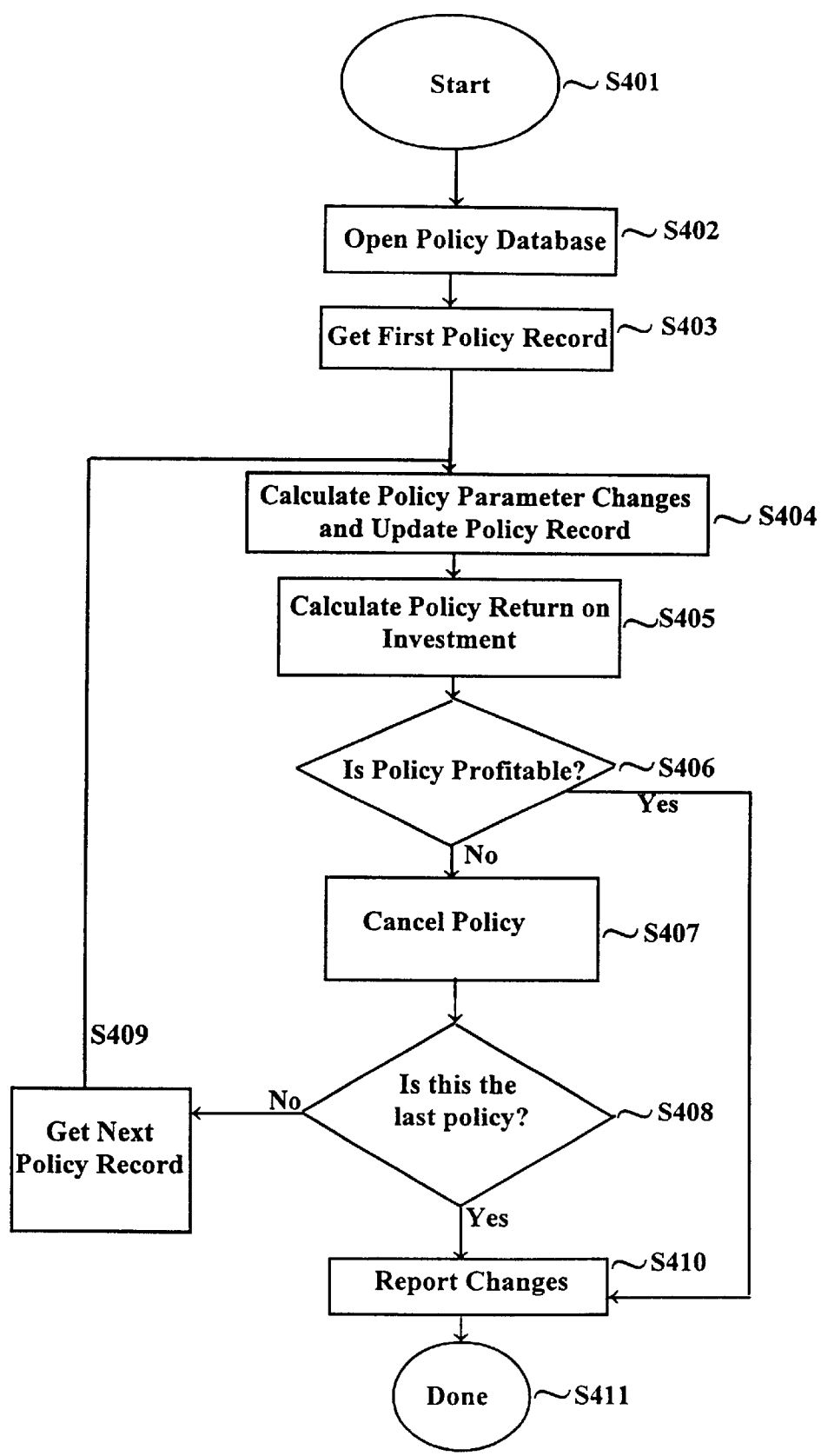
FIGS. 4 and 4a are high-level flow charts of the steps taken by the apparatus in FIG. 1 in practicing the invention.

FIG. 4 is a high-level flow chart depicting the overall operation of the apparatus in FIG. 1, in accordance with the steps of the invention starting at step S401 and ending at step S411. In particular, at steps S402 and S403 respectively, CPU 101 opens policy database 111 and accesses the data for the first policy record of interest, for example, policy record P1.

Using the data from the policy record, and data from global data 112, CPU 101 then calculates at step S404 any changes to the policy, including the policy's terms and values, and updates and adjusts the policy record with those changes. Next, at step S405 CPU 101 calculates the policy return on investment. Then, CPU 101 asks, "Is the policy profitable?" at step S406. The policy is profitable when the return on investment is greater then the desired hurdle rate. An exemplary hurdle rate is 15%–20% return on investment. If the policy is not profitable, CPU 101 cancels the policy at step S407 and moves to step S408. Alternatively, if the policy is profitable, a "yes" response in step S406, CPU 101 moves directly to step S408. At step S408, CPU 101 determines if this is the last policy record of interest. If not, CPU 101 gets the next policy record at step S409, e.g., policy record P2, and executes step S404 for that policy record. CPU 101 continues executing step S404 for each policy record of interest until at step S408 CPU 101 determines that there are no other policy records of interest to evaluate in policy database 111. CPU 101 then executes step S410 to generate a report detailing the changes made to the policies. The changes can be reported either on an individual policy-by-policy basis or on an aggregate basis for all policies.

Figure 4A:
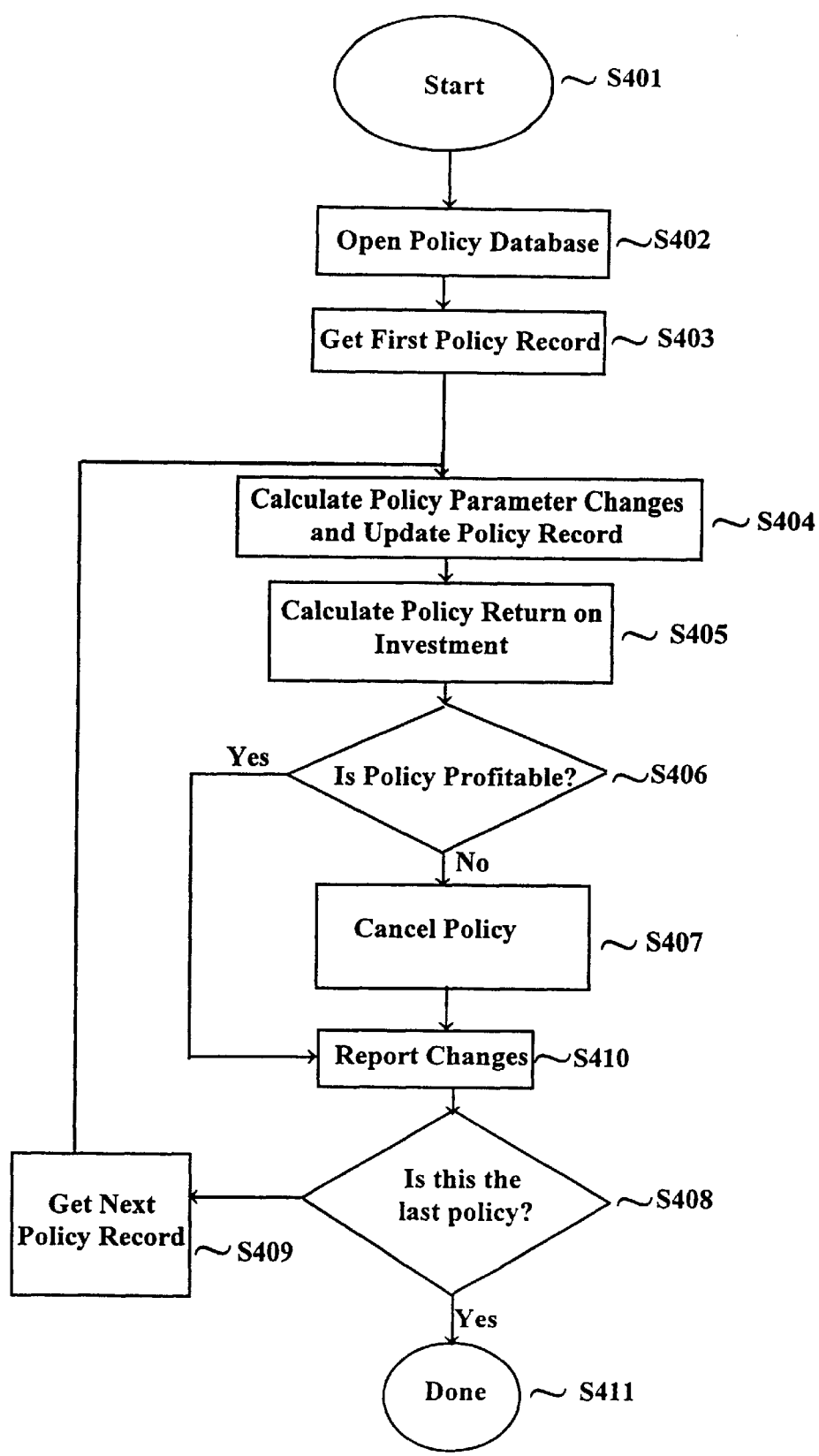

FIG. 4a is substantially similar to FIG. 4; however, it illustrates an alternative embodiment where changes to a policy record are reported as each policy is evaluated.

Figure 5:
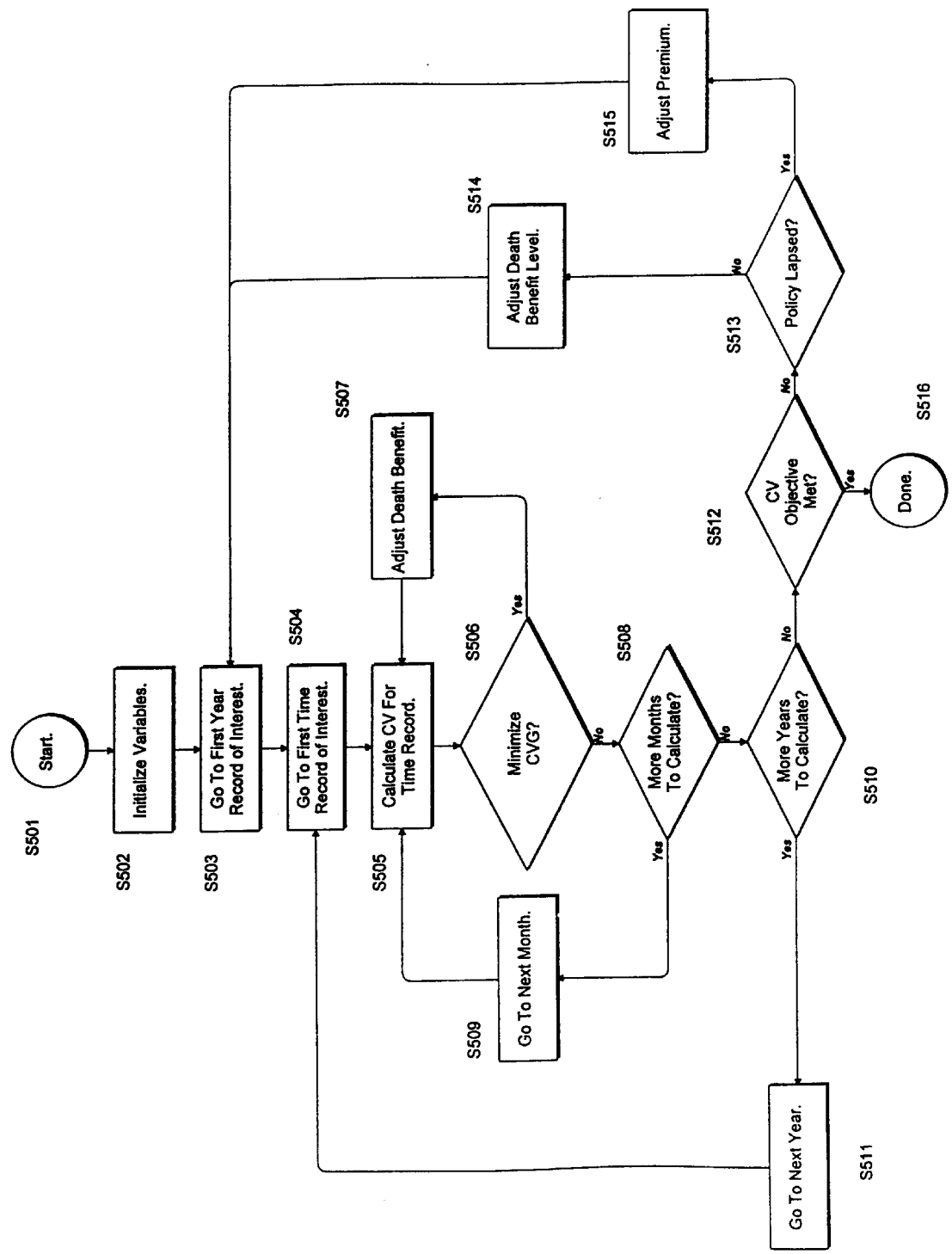
FIG. 5 is a detailed flow chart further illustrating step S404 of FIG. 4.

FIG. 5, starting at step S501 and ending at step S516, is a flow chart depicting in greater detail step S404 of FIGS. 4 and 4a. In step S502, CPU 101 initializes any variables and parameters needed for calculating changes to the current policy record (i.e., the currently accessed policy record). These variables and parameters may include, for instance, data on how frequently policy premium-s are paid and industry standard actuarial tables for the particular policy holder's sex, age, and health. Global data 112 may also be accessed at this time, and it is well within the ability of one skilled in the art to retrieve this data at other times, such as in step S402, if needed.

Once the initialization step is complete, CPU 101 executes steps S503 and S504 to access the first related year record of interest and the first related time record of interest of that year record, respectively.

For purposes of illustrating steps S503) and S504, using the database as described in FIGS. 2 and 3, let the anniversary date for the currently accessed policy be January 1 and let the administration system be run once a year, only December 31. At the end of the first run, all related year and month records for that year will have data entered, through 109 year records. The terms and values calculated for the months of the first year record would use the actual data of premiums paid in, interest rates, benefits paid out, etc. The data in the following year records would be projected data based on anticipated values, such as interest rates and mortality rates and costs. When the calculations are run again on December 31 the following, year, CPU 101 can start the calculations beginning on the related year record and January month record for the second year, since the related year record for the first year now has historical data and no longer needs to be calculated.

At step S505, CPU 101 calculates the insurance policy's cash value for the current time record, which in this example is a projected cash value. Determining the cash value of the policy will be described in greater detail in FIG. 6.

Next, CPU 101 determines at step S506 whether the projected CVG meets a predetermined criteria. For instance, in the case of a bank, the CVG may need to be minimized, for example, so that the cash value is within a certain percentage of the basis to meet the CVG objectives for that bank. The bank may also want to minimize this projected CVG due to governmental regulations. In the preferred embodiment, the basis of the insurance policy is the total of all premium payments paid or to be paid up to this point in time.

To minimize this projected CVG, at step S507 CPU 101 first attempts to adjust the death benefit for that time period by increasing the death benefit level of coverage. Increasing the death benefit level increases the cost of the policy, which in turn reduces the projected cash value, and thus reduces the CVG. In the preferred embodiment, the adjustment to the death benefit in step S507 is given by the formula:

$$DB\ adj. = .95 * \frac{CVG}{\text{cost of insurance per 100k of benefits}}$$

where

CVG=cash value—total premium payments

Flow then resumes at step S505 to recalculate the projected CVG based on the adjusted death benefit level.

In the United States, the maximum death benefit level is constrained by regulations, which may vary from state to state. For example, some state regulations constrain the maximum death benefit to 160% of the insurable interest. For the case of a bank and home mortgages, the death benefit level cannot be increased beyond 160% of the initial mortgage amount. If at step S506 the death benefit level cannot be increased any further to minimize CVG, then program flow continues to step S508.

If there are more time records to calculate, as determined in step S508, then CPU 101 accesses at step S509 the next related time record and calculates the projected cash value of the insurance policy for that time period. In this manner, CPU 101 calculates the projected cash value and the terms needed to achieve that cash value for each of the related time records for the currently accessed year record.

If at step S508 CPU 101 determines that all calculations for the currently accessed year record are complete. It then determines at step S510 whether there are more year records to calculate. If so, CPU 101 proceeds to step S511 to access the next year record and starts calculating in the manner described above the projected cash values for each of the related time records for that year.

If at step S510 CPU 101 determines that there are no additional related year records to calculate, then CPU 101 determines at step S512 whether the cash value objective for the end of the insurance policy term has been met.

To achieve the cash value objective, as depicted by lines 703 and 803 of FIGS. 7 and 8, CPU 101 examines the cash value at the end of the policy term and compares it to a predetermined criteria. Thus, for a 30-year mortgage the typical policy would have, although not be limited to, a term of 30 years, depending on the objectives of the bank. CPU 101 would examine the projected cash value at year 30, and if the policy is still in-force at this time, that is, there were sufficient premiums to pay for coverage through to this time, and the projected cash value meets a predetermined criteria, such as the cash value being within a few percentage points of the cost of insurance for that year, then the cash value objective of the preferred embodiment has been met and program flow returns to S408 on FIG. 4.

If the cash value objective has not been met, program flow proceeds to step S5 13 where CPU 101 determines if the policy will lapse. If the policy will still be in-force, then the cash value must be greater than the cash value objective and thus must be reduced. In the preferred embodiment, at step S514, the excess cash value is reduced by adjusting the death benefit as in step S507, if possible, or by adjusting the time that the death benefit remains at a particular level. Referring to FIG. 8, line 805 illustrates that the death benefit level is adjusted to be maintained at the same level as year five for two additional years, though it may have been different in the first iteration. This will increase the cost of insurance for those two years and thus reduce the cash value and control the CVG.

If at step S513 the policy has lapsed, then additional premiums must be paid in to fund the insurance policy for the remainder of the term. Thus, a "yes" response is provided in block S513 and the process moves to block S515 where the premium is adjusted. This adjustment to the premium would typically take place as early as possible. For instance, using the previous example, if calculations at the end of the second year indicate that insufficient premiums are needed to fund the policy to full term, then the additional amount needed should be determined and deemed to have been paid during the third year, the first and second years having already past. This amount can be determined, for instance, by alternatively adding additional premium payments to the cash value and determining if the amount is sufficient to fund the policy to term. Referring to FIG. 10b, another way to determine the additional premium payments would be, for instance, to vertically raise the cash value curve, i.e. line 1004, so that the cash value at the end of the term is sufficient (for example, crosses the x-axis at the end of the term). The amount line 1004 was raised is the amount of additional premiums needed.

Flow then returns to step S503 with the new premium values or death benefit level adjustments to recalculate the projected cash value, death benefit and other terms and values as just described above, until the cash value objective at step S512 has been met.

Figure 5A:
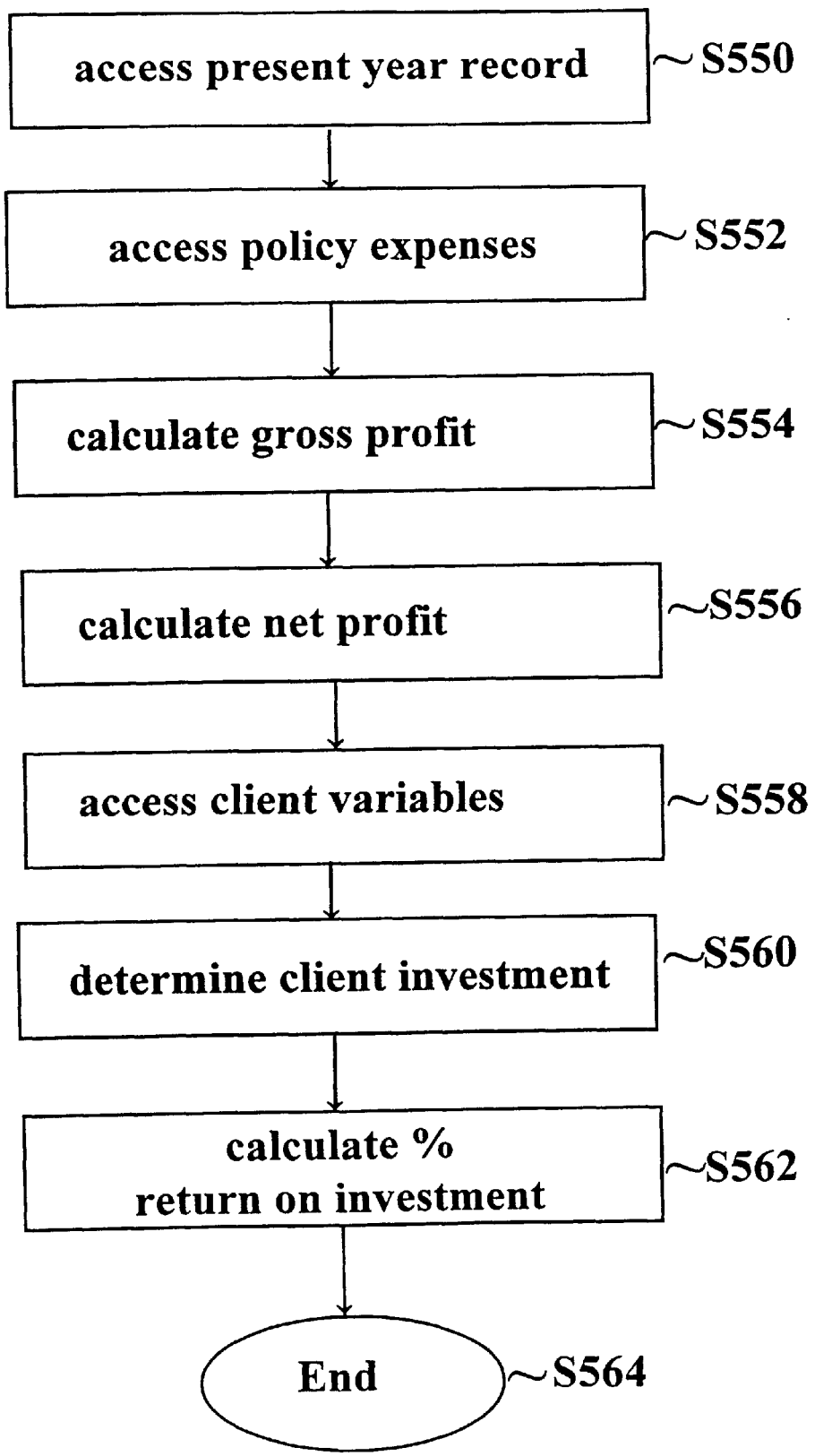
FIG. 5a is a detailed flow chart further illustrating step S405 of FIG. 4.

FIG. 5a, starting at step S550 and ending at S564, is a flow chart depicting in greater detail step S405 of FIGS. 4 and 4a. In step S550, CPU 101 accesses the present year record of the policy being reviewed. CPU 101 next moves to step S552 and accesses the policy expenses for that policy. The policy expenses include such things as the proportionate share of the administrative expense, commission expense, funding costs and the expense of insurance company profits. CPU 101 then moves to step S554 and calculates the gross profit of the policy. The gross profit of the policy is equal to the policy premium or policy cash value multiplied by the rate of return. For example, if the premium or cash value is $10,000 and there is a 6% return, the gross profit is $600 dollars. The process then moves to step S556 and calculates the net profit. The net profit is equal to the gross profit calculated in step S554 minus the expenses calculated in step S552. CPU 101 then moves to step S558 and accesses client variables. The variables include such factors as the % of equity used to invest in the premium. For most lending institutions, the percent equity is between 5% and 7%. CPU 101 next moves to step S560 and determines the client investment. This would be the amount of equity the client paid toward the premium. Next, the processor moves to step S562 and calculates the percent return on the investment. Percent return on investment is the net profit divided by the investment calculated in step S560. In step S564, CPU 101 returns to the main routine of FIG. 4 or FIG. 4a.

Figure 6:
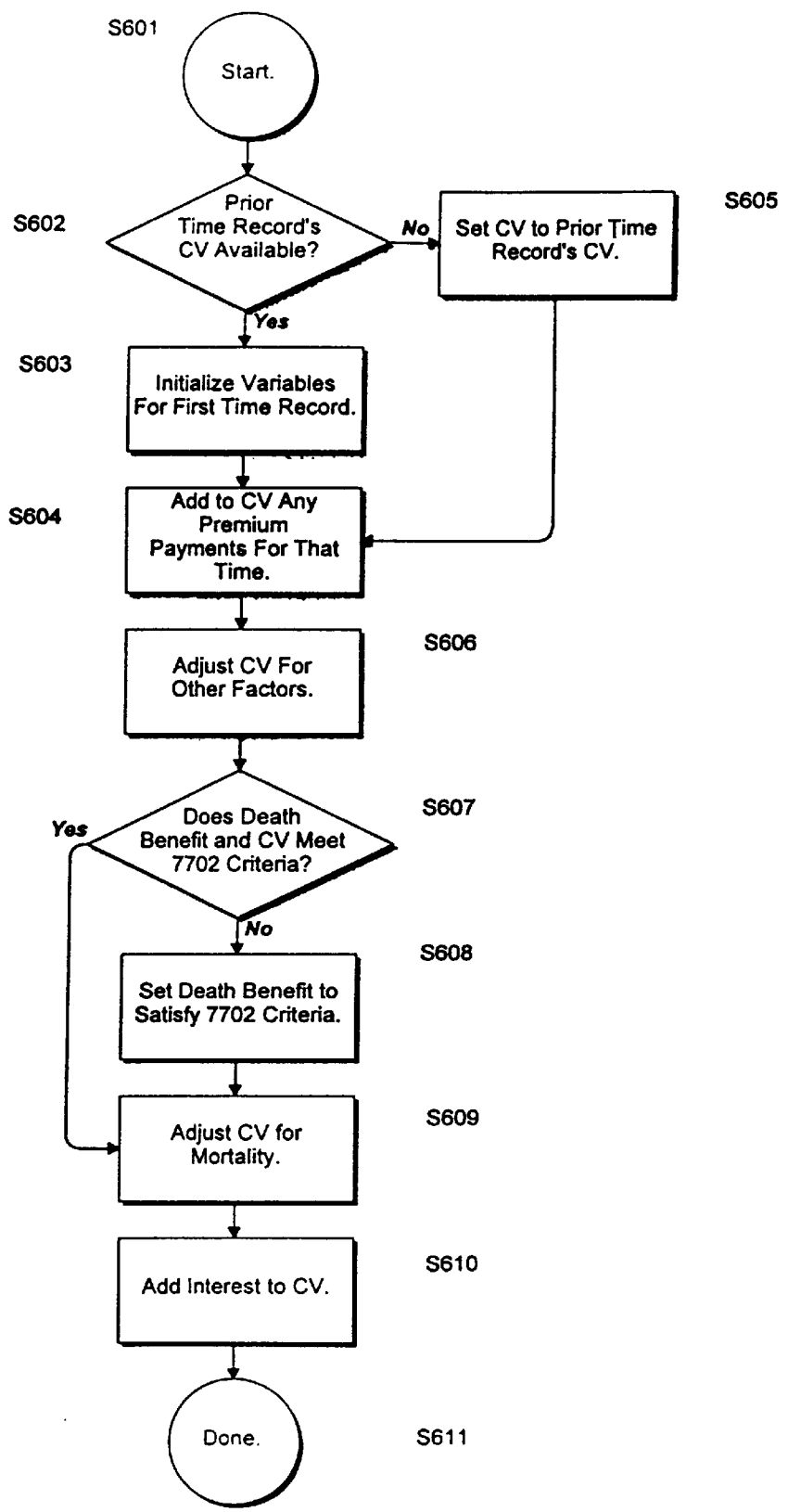
FIG. 6 is a detailed flow chart further illustrating step S505 of FIG. 5.

FIG. 6, starting at step S601 and ending at step S611, depicts in greater detail step S505, which primarily calculates the insurance policy's cash value at a particular point in time. Specifically, CPU 101 at step S602 determines if there is a prior time record cash value that can be used when calculating the current time record's cash value. If there is, then CPU 101 uses at step S605 the cash value of the prior time record as the initial cash value for the current time record. If at step S602 CPU 101 determines that there is no prior time record, such as when the current time record is the first time record of the first year record, then CPU 101 will assign a value in step S603 for the initial cash value, for example, a value of zero.

Next, CPU 101 adds at step S604 any additional premiums paid, or projected to be paid, for that point in time, to the initial cash value. At step S606, CPU 101 adjusts the cash value for other factors, such as additional premium payments, refunds based on the "pooled mortality," or interest rates. In effect, step S606 calculates the cash value of the insurance policy for that point in time.

To manage the CVG accurately, the preferred embodiment uses a block of life insurance, with a large number of insurance policies all in the same or similar class. This allows the use of a "pooled mortality." Insurance carriers could then use pooled mortality rates for the class to determine the amount of death benefits it expects to pay out over a given time period. Depending on the terms of the policies, any amount not paid out could be refunded to the insurance policies in the block as a dividend or excess interest credit, thereby increasing the policies' individual and aggregate cash value. As to interest rates, if the expected interest rate used throughout the year was 6% per month, but at the end of the year, was determined to actually be 6.5% per month, then the cash value could be recalculated using a 6.5% interest rate. Any surplus or deficit could then be prorated for each policy and added or subtracted from the cash value, respectively, for each policy.

Next, at step S607, CPU 101 determines if the insurance policy complies with governmental regulations. In the embodiment shown in FIG. 6, CPU 101 determines if the policy's death benefit and cash value comply with IRS Regulation S 7702. If there is compliance, flow proceeds to step S609, otherwise CPU 101 adjusts the death benefit at step S608 to force compliance with §7702 for a given cash value. Of course, if there are any other regulations to comply with (governmental or otherwise) such steps could be added in the necessary place in the system logic flow by one skilled in the art. Flow then proceeds to step S609.

At step S609, CPU 101 adjusts the cash value for mortality (which can be different for different insurance carriers) and then adds the interest amount for the relevant time period at step S610. This completes the calculation of the cash value for the current time record.

Although one way of calculating the cash value of the insurance policy is presented herein, the present invention is not limited to such calculation. It is well known in the art that the cash value for an insurance policy depends on a multitude of variables, such as the demographics of the insured, assumed interest rates, and financial objectives of a company, all of which may vary between companies and between insurance companies. Nevertheless, it is well known in the air, and well within the ability of one skilled in the art, to use these variables in determining the cash value curve for an insurance policy and as such, the cash value curves, as shown by lines 904, 1004, and 1104, for example, will vary depending on the exact circumstances and particulars of an insurance policy.

In an alternative embodiment, CPU 101 at step S506, determines if the calculated CV has deviated from an expected cash value in accordance with a predetermined criteria. If, for example, the calculated CV is below a predetermined amount from an expected cash value, then there may be insufficient premiums to continue the policy to full term, and additional premiums are needed to sustain the policy to term. Such an adjustment to the premium can also take place in step S507. Alternatively, the policy may lose profitability or fail to meet hurdle rates, and be canceled.

Figure 12B:
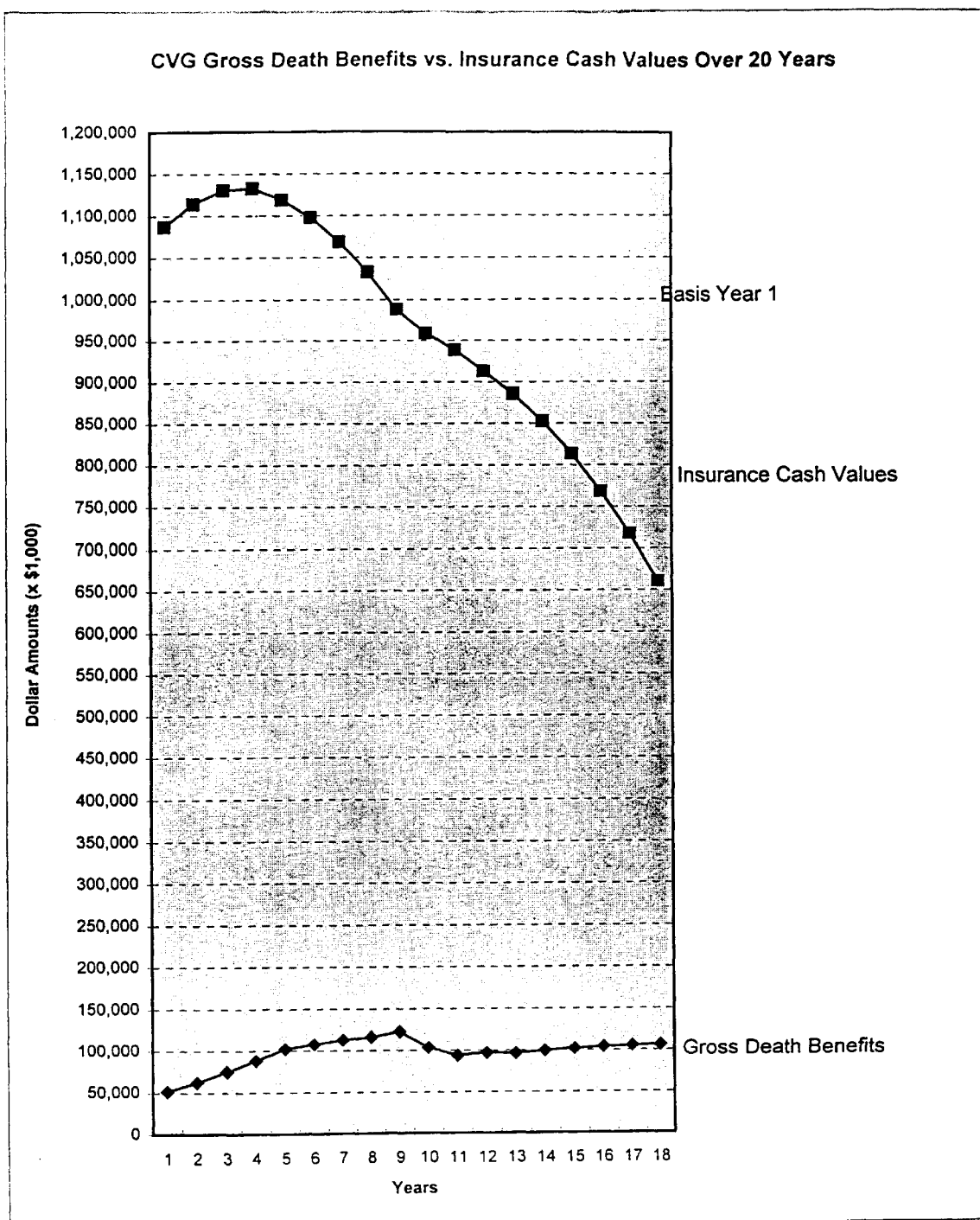
FIG. 12b is a graphical illustration of insurance cash flows and cash values verses time.

Attention is next directed to FIGS. 12a and 12b. FIG. 12a is a spreadsheet illustrating insurance proceeds, cash values and the internal rate of return ("IRR") for the first 20 years of an exemplary block of policies with $1 billion dollars in premium. FIG. 12b is a graph illustrating the cash values in the policy over time and the gross death benefits received per year over time.

The exemplary policies illustrated in FIGS. 12a and 12b are designed, such that $1 billion dollars in premium is purchased and the purchaser's cost of funds is 6%. The carrier's net rate of return on invested cash values is 10%. The cost of insurance is designed to be 25% of 1980 CSO in year 1, and increasing by 5% until year 7, where the mortality charge is fixed at 55% of 1980 CSO and remains at 55% of 1980 CSO for the remainder of the policy term. The assumption is that the $1 billion in premium is paid all in the first year.

With particular attention to FIG. 12a, it can be seen that $1 billion of policy premium paid in year one, the insurance proceeds in year one are $32.3 million, and they rise through year 11 to a maximum of $122.8 million, then the insurance proceeds stabilize to approximately $1 million per year. At the same time, the insurance cash value rises at the end of year one to $1.006 billion, and the cash values continue to rise until year 6. At year 6, the cash values begin to fall. The DAC asset is counted separately, and begins at approximately $40 million and decreases over 10 years to zero. The face amount of insurance is at a maximum in year one, and declines through the first 20 years.

Reference is next made to FIG. 12b, where the gross death benefits are graphically illustrated over time, and after the first 3 years, there is a stable return of approximately $1 million per year in gross death benefits. These gross death benefits can be calculated with some degree of certainty, and a present value calculation can be completed for these cash flows, so that these death benefits may be sold to a third party. Additionally, if death benefits are not received in a given year, due to less deaths than expected, the cash value will grow for that year, and will be paid back to the policies in investment returns as described above. Thus, the cash values in the policies can also be used as security in the transaction.

The invention is generally discussed above in connection with a system and method wherein the system controls the CVG in the pool of insurance policies. The CVG and the death benefits paid out are by definition inversely related to each other. As the death benefits are increased, the mortality charge is increased and the cash value or CVG decreases. In an alternative preferred embodiment of the invention, the system and method focuses on the death benefit proceeds rather than the CVG. One preferred manner of managing an actuarially credible pool of life insurance policies on a pool of lives to generate a consistent cash flow from death benefits paid on the insurance policies begins with a first step of determining the first premium which is substantially the same as is done to manage the CVG. The system must access selected data having terms associated therewith, wherein said data is representative of the pool of life insurance policies; for example, the term may include the cash values, interest rates, death benefits, etc. Next the system must access an actuarial mortality table, such as 1980 CSO or any other recognized mortality table. From this a determination may be made of the expected number of deaths in the pool of lives based on the data and the mortality table. Next the system modifies at least one of said terms in the policies, such as adjusting the death benefits, so that the determined number of deaths produce a desired cash flow. For example, if 10 deaths are expected in one year, and 1 million in cash flow is desired, the death benefit per life should be set at $100,000 per life. If after six months there have not been five deaths, the death benefits would be increased. Alternatively, if there were more than five deaths the death benefits would be decreased. Next, at least a portion of the cash flow may be sold to a third party. The system determines the value of the cash flow, so that it may be sold.

In the manner described above, the present invention thus provides a system and method to adjust insurance policies terms and values to manage their CVG and death benefit cash flow. While this invention has been described with reference to the preferred embodiments, other modifications will become apparent to those skilled in the art by study of the specification and drawings. It is thus intended that the following appended claims include such modifications as fall within the spirit and scope of the present invention.

What we claim is:

1. A method of managing an actuarially credible pool of life insurance policies to generate a consistent cash flow from death benefits paid on the insurance policies, comprising the steps of accessing selected data having terms associated therewith, wherein said data is representative of the pool of life insurance policies, calculating a cash value of the pool of life insurance policies from said selected data of the pool of life insurance policies for a predetermined future point in time, comparing said cash value of the pool of life insurance policies to a predetermined desired cash value at said predetermined future point in time, modifying at least one of said terms in accordance with a predetermined criteria, so the cash value of the life insurance policies is managed and an actuarially definable cash flow is obtained.

2. The method of managing an actuarially credible pool of life insurance as claimed in claim 1, wherein at least a portion of the actuarially definable cash flow is analyzed, so that at least a portion of the actuarially definable cash flow is sold to a third party.

3. The method of managing an actuarially credible pool of life insurance as claimed in claim 2, wherein the analysis of the at least a portion of the actuarially definable cash flow includes a present value analysis.

4. A method of managing an actuarially credible pool of life insurance policies on a pool of lives to generate a consistent cash flow from death benefits paid on the insurance policies, comprising the steps of accessing selected data having terms associated therewith, wherein said data is representative of the pool of life insurance policies, accessing an actuarial mortality table, determining the expected number of deaths in the pool of lives based on the data and the mortality table, modifying at least one of said terms, so that the determined number of deaths produces a desired cash flow.

5. The method of managing an actuarially credible pool of life insurance as claimed in claim 4, wherein at least a portion of the desired cash flow is analyzed, so that at least a portion of the desired cash flow is sold to a third party.

6. The method of managing, an actuarially credible pool of life insurance as claimed in claim 5, wherein the analysis of the at least a portion of the desired cash flow includes a present value analysis.

7. A computer system for managing an actuarially credible pool of life insurance policies to generate a consistent cash flow from death benefits paid on the insurance policies, comprising a database for storing data having terms associated therewith, means for accessing selected data, wherein said data is representative of the pool of life insurance policies, a calculator which calculates a cash value of the pool of life insurance policies from said selected data of the pool of life insurance policies for a predetermined future point in time, a comparing member which compares said cash value of the pool of life insurance policies to a predetermined desired cash value at said predetermined future point in time, means for modifying at least one of said terms in accordance with a predetermined criteria, so the cash value of the life insurance policies is managed and an actuarially definable cash flow is obtained.

8. The system of managing an actuarially credible pool of life insurance as claimed in claim 7, further comprising a member which analyzes at least a portion of the actuarially definable cash flow, so that at least a portion of the actuarially definable cash flow is sold to a third party.

9. The system of managing an actuarially credible pool of life insurance as claimed in claim 8, wherein said member calculates the present value of at least a portion of the actuarially definable cash flow.

10. A system of managing an actuarially credible pool of life insurance policies on a pool of lives to generate a consistent cash flow from death benefits paid on the insurance policies, comprising a database for storing data representative of the pool of life insurance policies, means for accessing selected data from said database having terms associated therewith, means for accessing an actuarial mortality table, a processor which determines the expected number of deaths in the pool of lives based on the data and the mortality table, modifying at least one of said terms, so that the determined number of deaths produces a desired cash flow.

11. The system of managing an actuarially credible pool of life insurance as claimed in claim 10, wherein said processor analyzes at least a portion of the desired cash flow, so that at least a portion of the desired cash flow is sold to a third party.

12. The system of managing an actuarially credible pool of life insurance as claimed in claim 11, including a calculator which calculates the present value of the at least a portion of the desired cash flow.

* * * * *